H. J. LEE.
MEANS FOR SETTING AND LOCKING VEHICLE STEERING WHEELS.
APPLICATION FILED JUNE 3, 1920.

1,362,016. Patented Dec. 14, 1920.

INVENTOR.
Henry James Lee
per Norman S. Barlow
Attorney.

UNITED STATES PATENT OFFICE.

HENRY JAMES LEE, OF LONDON, ENGLAND.

MEANS FOR SETTING AND LOCKING VEHICLE STEERING-WHEELS.

1,362,016.  Specification of Letters Patent.  Patented Dec. 14, 1920.

Application filed June 3, 1920. Serial No. 386,418.

*To all whom it may concern:*

Be it known that HENRY JAMES LEE, a subject of the King of Great Britain, residing at 58 New Compton street, London, W. C., England, has invented a new and useful Improved Means for Setting and Locking Vehicle Steering-Wheels; and he does hereby declare the following to be a full, clear, and exact description of the same.

This invention has reference to a new or improved means for setting and locking the swiveling axles or axle ends carrying the steering wheels of vehicles relatively to the fixed or non-steering axle to prevent unauthorized use or theft of the vehicle.

The invention comprises means for setting and locking the swiveling axles or axle ends carrying the steering wheels of vehicles relatively to the fixed or non-steering axle and is characterized by a lock controlled tongue and groove interlocking of the swiveling to the fixed part of the axle.

The invention will now be described with reference to the accompanying sheet of drawings which illustrate two methods of carrying the invention into practical effect similar reference numerals indicating similar parts in the different views. In the drawings:—

Figure 1:
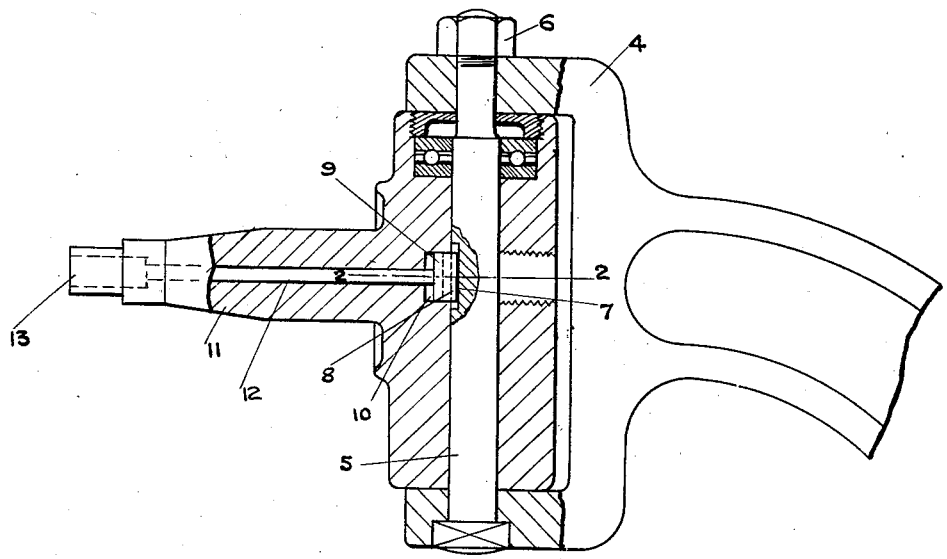
Figure 1 is a part sectional front elevation of that part of the axle mechanism of an automobile to which the invention is applied, and illustrating the application.

Referring to the drawings, the fixed axle 4 is provided in the ordinary manner with the vertical axle pin 5 which is secured in the end jaws of the fixed axle by means of a nut 6. Formed in the periphery of the axle pin are a series of slots 7 which are adapted to be engaged by a correspondingly shaped tooth 8 formed on a segmental member 9 the segmental member being permitted a longitudinal motion within a slot 10 in the wheel axle 11, the said segmental member 9 being connected to a horizontally disposed pin 12 which passes through the center of the wheel axle 11 and is connected at its outer end to a lock 13 of any type which will permit of a longitudinal motion being imparted to the pin 12, the said lock being operated by a key under the control of the owner or driver of the vehicle. The pin 12 together with the segmental member 9 move with the wheel axle 11 in addition to the separate longitudinal motion which can be imparted to them from the lock 13.

Figure 2:
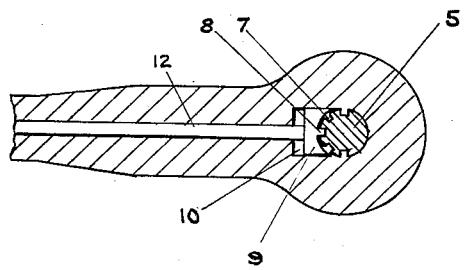
Fig. 2 is a sectional plan on line 2—2 of Fig. 1.

The operation of this mechanism is as follows: When the vehicle is in use the pin 12 together with the segmental toothed member 9 are drawn outwardly by means of the lock mechanism 13 and are maintained in this position when the car is in use. When it is desired to leave the car the pin 12 is moved longitudinally inward by means of the lock mechanism 13 so as to engage the tooth 8 within one of the recesses 7 in the axle pin, the wheel axle 11 of course requiring to be set at a position which will permit of the tooth 9 engaging within one of the said slots 7. Preferably two or three settings of the wheel axle relative to the axle pin are provided for as will be seen on reference to Fig. 2 of the drawings. A reversal of the motion of the segmental member 9 and the pin 12 frees the wheel axle when it is desired to again use the vehicle.

Various other means may be employed for carrying this invention into effect within the scope of the claim hereto appended, but the foregoing illustration will be sufficient to describe my invention and its application more particularly to the front axle of a motor car.

Claim:—

In combination a wheel axle adapted to support an automobile wheel, said wheel axle being hinged upon an axle pin and adapted to swing radially relative to the fixed axle; a lock positioned within said wheel axle and co-axial therewith, a locking member connected to said lock and co-axial with said wheel axle and adapted to be interlocked with the axle pin for the purpose of maintaining the wheel axle in a determined position relative to the fixed axle.

In testimony whereof, I have signed my name to this specification.

HENRY JAMES LEE.